US010343768B2

(12) United States Patent
Bellet et al.

(10) Patent No.: US 10,343,768 B2
(45) Date of Patent: Jul. 9, 2019

(54) LANDING GEAR WELL ROOF

(71) Applicant: AIRBUS OPERATIONS (S.A.S.), Toulouse (FR)

(72) Inventors: Daniel Bellet, Saint-Lys (FR); Guillaume Gallant, Lareole (FR); François Loyant, L'Isle Jourdain (FR); Alexandre Legardez, Clermont Saves (FR); Simon Roux, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 552 days.

(21) Appl. No.: 14/973,489

(22) Filed: Dec. 17, 2015

(65) Prior Publication Data
US 2016/0185451 A1 Jun. 30, 2016

(30) Foreign Application Priority Data
Dec. 30, 2014 (FR) ..................... 14 63428

(51) Int. Cl.
*B64C 25/04* (2006.01)
*B64C 1/10* (2006.01)
*B64C 1/18* (2006.01)
*B64C 25/12* (2006.01)

(52) U.S. Cl.
CPC ............. *B64C 25/04* (2013.01); *B64C 1/10* (2013.01); *B64C 1/18* (2013.01); *B64C 2025/125* (2013.01)

(58) Field of Classification Search
CPC .................. B64C 25/001; B64C 25/14
See application file for complete search history.

(56) References Cited

U.S. PATENT DOCUMENTS

| 2,479,976 A | 8/1949 | Schultz |
| 4,645,143 A | 2/1987 | Coffy |
| 5,086,996 A | 2/1992 | Roeder et al. |
| 5,100,083 A * | 3/1992 | Large ............. B64O 25/34 244/102 R |
| 7,641,146 B2 * | 1/2010 | Wood ............. B64C 1/061 244/100 R |

(Continued)

FOREIGN PATENT DOCUMENTS

| CN | 103863555 A | 6/2014 |
| EP | 0 408 432 A1 | 1/1991 |

(Continued)

OTHER PUBLICATIONS

French Search Report with Written Opinion for Application No. 1463428 dated Nov. 2, 2015.

(Continued)

*Primary Examiner* — Brian M O'Hara
(74) *Attorney, Agent, or Firm* — Jenkins, Wilson, Taylor & Hunt. P.A.

(57) ABSTRACT

An aircraft landing gear well roof including a first reinforced main structure and a second reinforced main structure spaced from each other in a transverse direction of the roof and equipped with respective mounting for articulating a structural element of the first landing gear and mounting for articulating a structural element of the second landing gear. A membrane connecting the first reinforced main structure and the second reinforced main structure is disposed between them in the transverse direction.

16 Claims, 6 Drawing Sheets

(56) References Cited

U.S. PATENT DOCUMENTS

| | | | |
|---|---|---|---|
| 8,567,150 B2 | 10/2013 | Gauthie et al. | |
| 9,272,776 B2 * | 3/2016 | Bellet | B64C 25/04 |
| 9,452,818 B2 | 9/2016 | Loyant et al. | |
| 9,499,256 B2 * | 11/2016 | Nakashima | B64C 25/001 |
| 2009/0283637 A1 | 11/2009 | Nolla | |

FOREIGN PATENT DOCUMENTS

| | | |
|---|---|---|
| EP | 2 019 773 A1 | 2/2009 |
| EP | 2 738 088 A1 | 6/2014 |
| EP | 2 738 888 A2 | 6/2014 |
| FR | 2 913 400 A1 | 9/2008 |
| FR | 2 999 149 A1 | 6/2014 |

OTHER PUBLICATIONS

Chinese Search Report for Chinese Application No. 201511005885.5 dated Dec. 25, 2018.
Chinese Office Action for Chinese Application No. 201511005885.5 dated Jan. 3, 2019.

* cited by examiner

LANDING GEAR WELL ROOF

CROSS-REFERENCE TO RELATED APPLICATION

This application claims the benefit of and priority to French patent application No. 14 63428 filed on Dec. 30, 2014, the entire disclosure of which is incorporated by reference herein.

TECHNICAL FIELD

The present disclosure relates to aircraft, and more particularly, to the main landing gear well. It concerns more specifically the roof of this gear well, as well as the environment of that roof.

The disclosure herein applies to all types of aircraft, in particular commercial aircraft.

BACKGROUND

On existing aircraft, the main gear well roof is generally intended to provide the separation between a pressurized upper compartment, usually the cabin of the aircraft, and a lower compartment forming a gear well for accommodating two main landing gears spaced transversely from each other.

This unpressurized gear well is delimited at the front by a wing box integrated into the fuselage, this box being intended for the connection of the two wings of the aircraft, on respective opposite sides thereof in the transverse direction. Moreover, the gear well roof is generally fixedly mounted on the upper skin of the wing box. Accordingly, in the event of a positive vertical maneuver of the aircraft, the tolerable deformations of the central wing box, in the transverse direction, tend to cause unintended stresses on and deformation of the gear well roof, in the same direction. To limit the negative consequences of these unintended deformations, designing a more flexible roof might be envisaged. However, this solution may prove unsuitable if the roof must absorb mechanical forces coming directly from structural elements of the landing gear, such as the strut.

There is therefore a requirement to optimize the design of the environment of the roof of the main gear well, aiming in particular to solve this problematic of the compatibility of deformations between the gear well roof and the central wing box.

SUMMARY

To address this requirement, the disclosure herein relates firstly to an aircraft landing gear well roof, the roof being intended to form a pressurization barrier between a pressurized upper compartment and a gear well for accommodating a first main landing gear and a second main landing gear, the roof comprising:
  a first reinforced main structure and a second reinforced main structure spaced from each other in a transverse direction of the roof and equipped with respective mounting for articulating a structural element of the first landing gear and mounting for articulating a structural element of the second landing gear; and
  a membrane connecting the first reinforced main structure and the second reinforced main structure disposed between them in the transverse direction.

The disclosure herein is noteworthy in that it breaks with earlier technical solutions in which the gear well roof was of relatively uniform design along its transverse direction. In fact, the disclosure herein artfully divides this roof into three distinct parts, namely the two reinforced main structures intended to form the rigid parts of the roof and an intermediate membrane, inherently more flexible, having a function similar to that of a mechanical decoupling between the two main structures. In this configuration, the intrinsic stiffness of the main structures makes it possible to absorb satisfactorily the mechanical forces introduced directly into these structures by the main landing gear. Moreover, because of the decoupling between these two main structures in the transverse direction, each of the structures is loaded only by a reduced transverse portion of the central wing box. This greatly reduces the appearance of unintended deformation of the reinforced main structures, notably in the event of a positive vertical maneuver of the aircraft.

In other words, the design of the gear well roof in accordance with the disclosure herein satisfactorily addresses the problematic of compatibility of deformations between this gear well roof and the central wing box whilst being able to absorb appropriately the mechanical forces coming directly from the main landing gear.

The disclosure herein has at least one of the following optional technical features, considered separately or in combination.

The membrane has a rounded shape so as to define a recess in the upper surface of the roof. It may preferably have a U-shaped cross-section, perfectly optimized to absorb the pressurization forces at the same time as providing the mechanical decoupling between the two reinforced main structures in the transverse direction.

The membrane has a curvature with a radius between 400 and 500 mm inclusive.

The membrane has a first end and a second end fixed to the first reinforced main structure and the second reinforced main structure, respectively, a main part of the membrane being arranged between the first end and the second end. These three elements are preferably made in one piece.

The first end and the second end each have a substantially vertical tangent. An angle is nevertheless possible between these tangents and the vertical direction, for example a maximum acute angle of 20°.

The main part of the membrane has a substantially constant thickness, preferably of the order of 0.7 to 1.5 mm.

The main part of the membrane is free of transverse stiffeners. On the other hand, longitudinal stiffeners are possible, attached to the membrane or made in one piece with the latter.

The main part of the membrane has a ratio between a width in the transverse direction and a height in a vertical direction between 0.7 and 1.3 inclusive.

The membrane is made of a metal or an elastomer-based material.

The mounting for articulating a structural element of the first landing gear is substantially centered on the first reinforced main structure and the mounting for articulating a structural element of the second landing gear is substantially centered on the second reinforced main structure.

The ratio between the transverse extent of the membrane and the transverse extent of the first and second reinforced main structures is between 0.1 and 0.2 inclusive.

Each of the first and second reinforced main structures comprises a panel or a set of stiffened panels as well as at least one longitudinal beam and at least one transverse beam.

In accordance with some aspects of the disclosure herein, an assembly for aircraft comprises:

a central wing box intended for the connection of the two wings on respective opposite sides thereof in the transverse direction;

the gear well roof as described above, arranged at the rear of the central wing box and each of the first and second reinforced main structures of which is fixedly mounted on this box;

the first and second main landing gears, the structural elements of which are articulatedly mounted on the mounting equipping the first and second reinforced main structures of the roof; and preferably, systems, such as ducts, routed longitudinally in a recess delimited by the membrane of the gear well roof.

Each of the first and second main landing gears preferably comprises a leg articulated about an articulation axis inclined relative to the transverse direction and inclined relative to the longitudinal direction.

Finally, in accordance with some aspects of the disclosure herein, an aircraft comprises such a gear well roof or such an assembly.

Other advantages and features of the disclosure herein will become apparent in the following nonlimiting detailed description.

BRIEF DESCRIPTION OF THE DRAWINGS

This description will be given with reference to the appended drawings in which.

DETAILED DESCRIPTION

Figure 1:
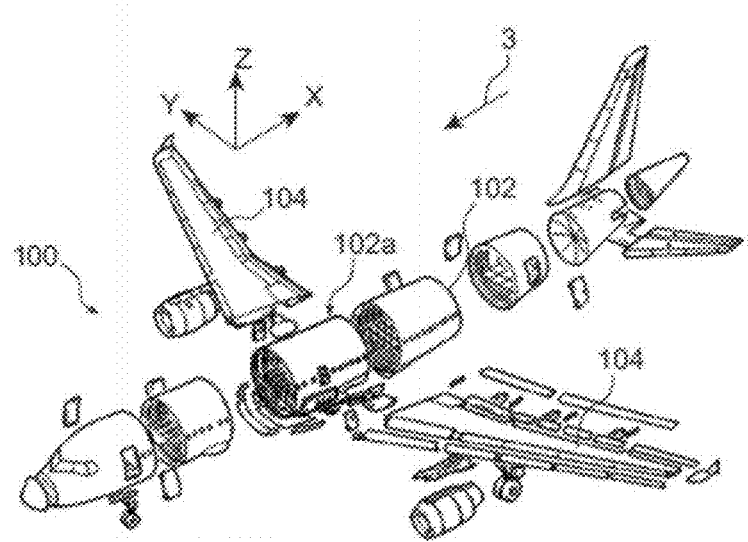
FIG. 1 represents an exploded perspective view of an aircraft in accordance with the disclosure herein.

Referring to FIG. 1, there is represented an aircraft 100 of the commercial aircraft type in accordance with the disclosure herein. Throughout the following description, by convention, X corresponds to the longitudinal direction of the aircraft, Y to the direction oriented transversely relative thereto, and Z the vertical or height direction, these three directions X, Y and Z being mutually orthogonal.

On the other hand, the terms "front" and "rear" are to be considered relative to a direction of forward movement of the aircraft caused by the thrust exerted by the turbojets, this direction being diagrammatically represented by the arrow 3.

The aircraft 100 includes a fuselage 102 to which two wings 104 are attached at the level of a fuselage section 102a specific to the disclosure herein.

Figure 2:
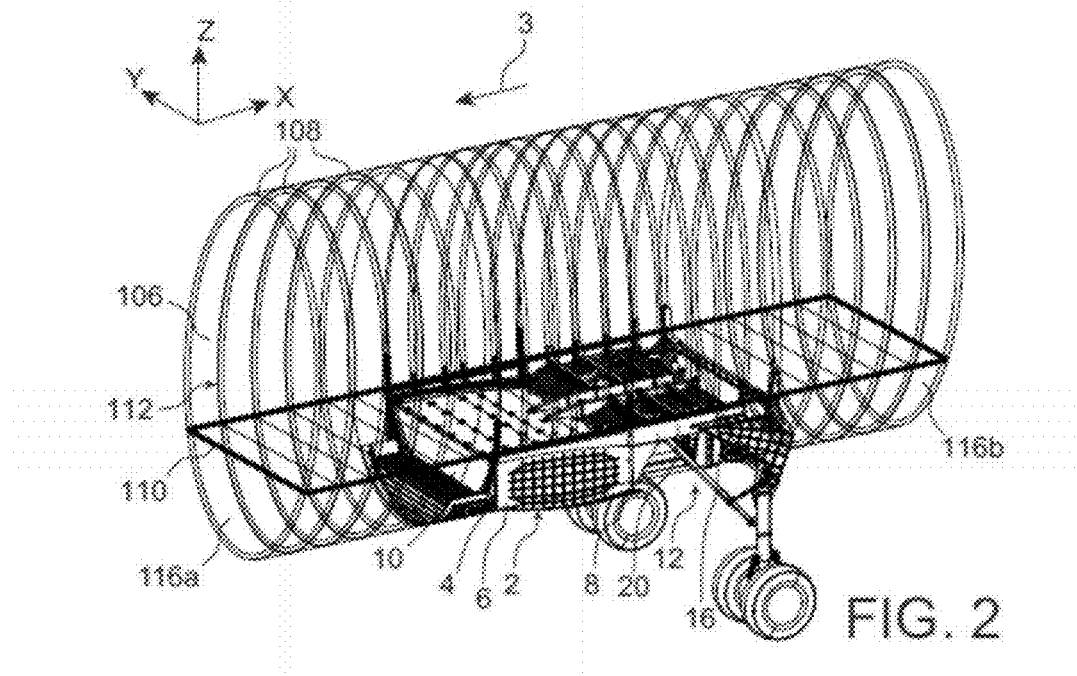
FIG. 2 represents a perspective view to a larger scale of the fuselage section integrating the disclosure herein.

This fuselage section 102a is represented in a more detailed manner in FIG. 2. It comprises a fuselage exterior skin 106, supported by substantially circular or elliptical fuselage frames 108. Within the section 102a there is provided a floor 110 on top of which is a pressurized upper compartment, namely the passenger cabin 112 of the aircraft. Under the floor 110, in front of this section 102a, there is a first underfloor pressurized compartment 116a usually dedicated to technical equipment specific to the aircraft and/or freight. The underfloor compartment 116a is delimited at the rear by a wind centre box 2, also arranged under the floor 100. The central wing box 2 extends transversely the complete width of the fuselage section 102a. It conventionally comprises an upper skin 4, a lower skin 6, a front skin 10, a rear skin 8 and lateral closure panels as well as interior stiffener ribs. It is intended for the connection of the two wings 104 on respective opposite sides thereof in the direction Y.

At the rear, the section 102a includes a gear well 12 for the accommodation of the two main landing gears (not represented in FIG. 2), spaced from each other in the direction Y. The well 12, of parallelepipedal overall shape, is delimited at the front by the rear skin 8 of the central wing box 2 integrated into the section 102a. The fuselage is open at the bottom in order to enable raising and lowering of the landing gear, the opening being blocked by mobile doors reconstituting the fuselage in the retracted position of the gear.

At the rear, the gear well 12 is delimited by an airtight end wall 16 separating this well from a second underfloor compartment 116b also dedicated to technical equipment and/or freight.

At the top, the well 12 is delimited by a gear well roof 20 extending the complete transverse width of the fuselage section 102a into which it is integrated. The roof 20, specific to the disclosure herein, is situated under the floor 110. Moreover, it is noted that above this roof, which forms a pressurization barrier, there is provided an intermediate pressurized compartment delimited between the floor 110 and this same roof 20. To simplify the figures, the passenger cabin and this intermediate pressurized compartment are associated with the same reference number 112.

It therefore constitutes a pressurization barrier between the pressurized passenger cabin 112 situated above this roof and the unpressurized gear well 12 accommodating the main landing gear. In this regard, in FIG. 3, the arrows represent the pressurization limit of the aircraft, this limit consisting of or comprising the following elements, from the front to the rear: the rear skin 10 of the central wing box 2, its upper skin 4, the gear well roof 20, and the airtight end wall 16 of the gear well 12.

Figures 3, 4:
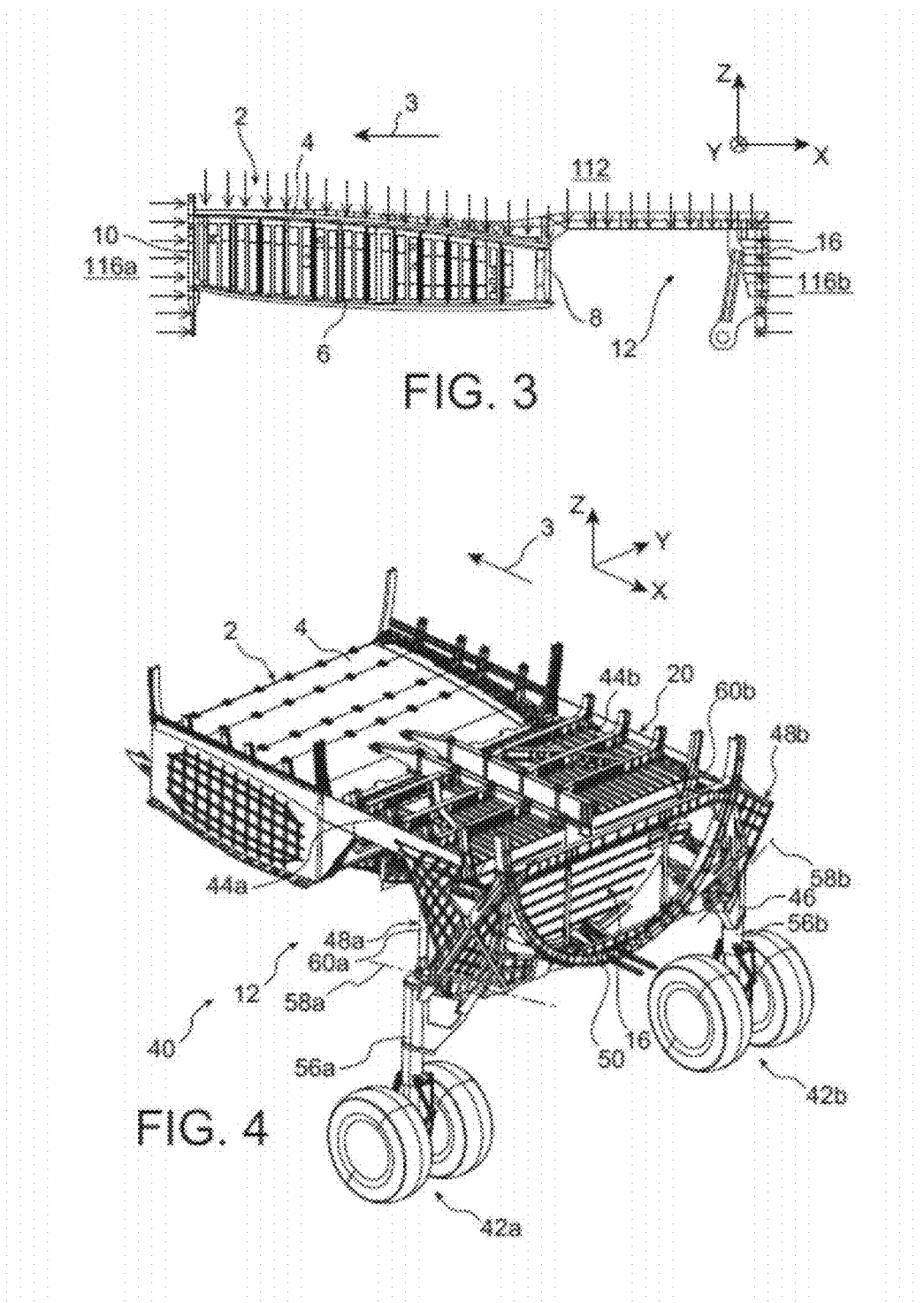
FIG. 3 represents a side view of a part of an assembly in accordance with a preferred embodiment of the disclosure herein.
FIGS. 4 and 5 show perspective views of this assembly seen from different angles.
Figure 5:
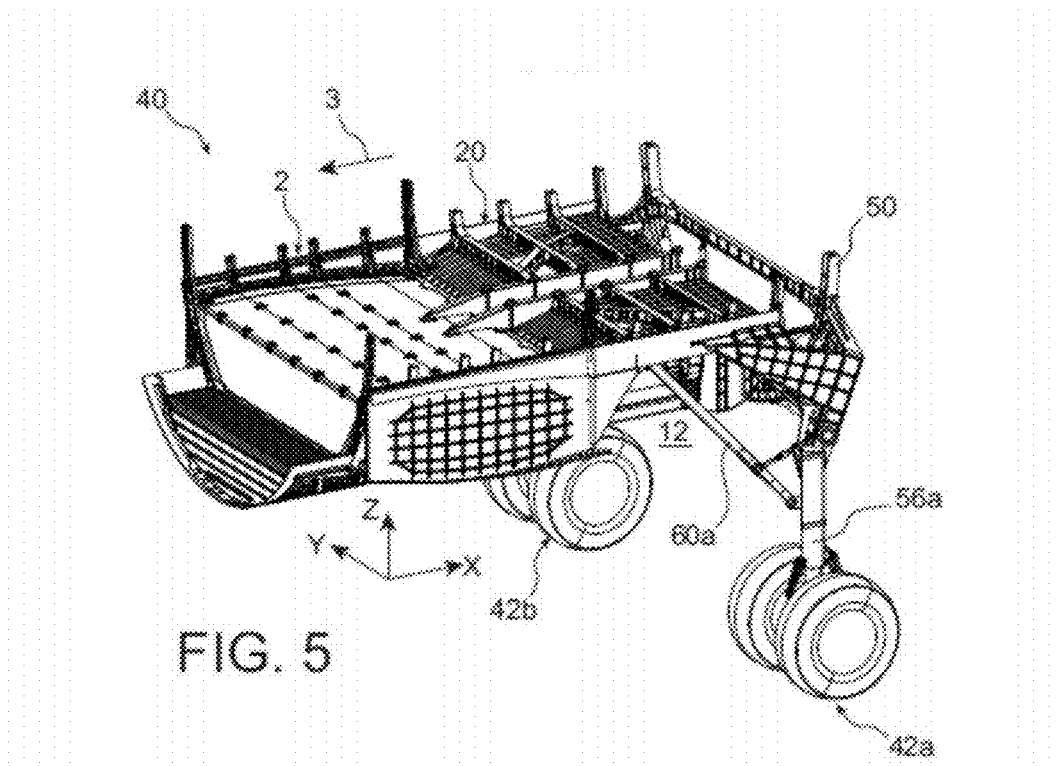
Figure 6:
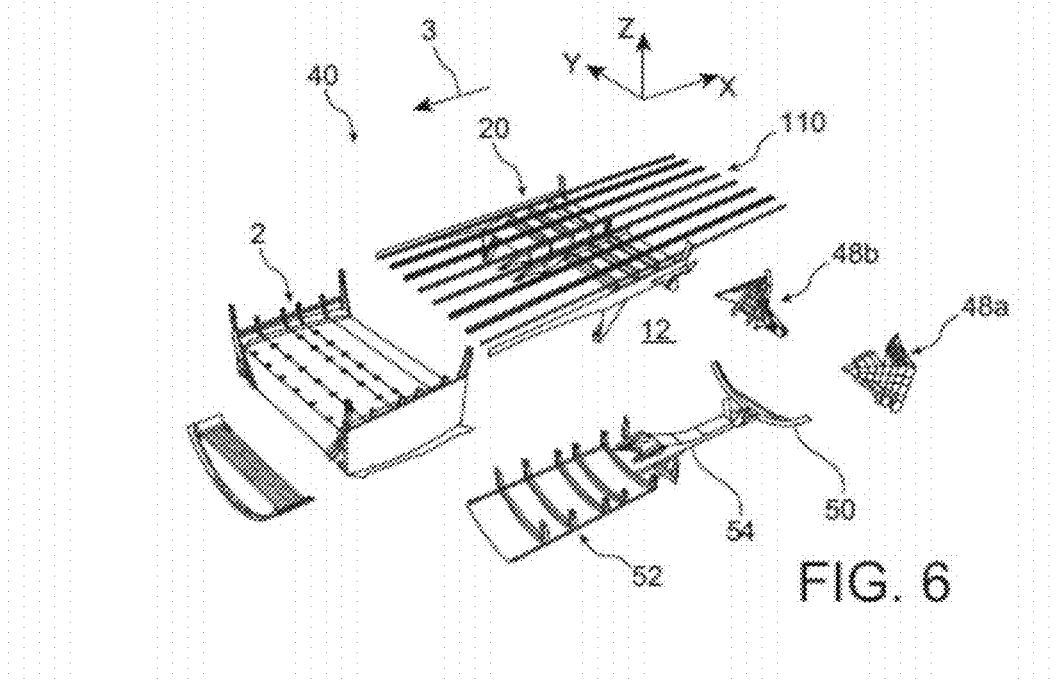
FIG. 6 is an exploded perspective view of the assembly shown in FIGS. 4 and 5.

An assembly 40 specific to the disclosure herein will now be described with reference to FIGS. 4 to 6. This assembly 40, intended to be integrated into the fuselage section 102a, globally includes the central wing box 2, the gear well 12 notably delimited by the roof 20 and the airtight end wall 16, and the two main landing gears 42a, 42b.

One of the particular features of the disclosure herein resides in the design of the roof 20, breaking with current technical solutions. In fact, it is divided in the direction Y into three distinct parts continuous with one another in order to fulfill the pressurization barrier function across the complete width of the fuselage. To be more precise, there are a first reinforced main structure 44*a* and a second reinforced main structure 44*b* symmetrically arranged with respect to a median plane XZ of the aircraft. The first structure 44*a* has an exterior longitudinal edge intended to be fixed directly to the fuselage, to the exterior skin and/or the frames of this fuselage. The same applies to fixing the exterior longitudinal edge of the second structure 44*b* to the fuselage on the opposite side. The interior longitudinal edges of these structures 44*a*, 44*b* are connected by a membrane 46 providing the function of mechanical decoupling between these two structures in the direction Y.

In other words, the gear well roof 20 can be regarded as an assembly consisting of or comprising three parts that will be described in detail hereinafter, respectively a flexible central portion 46 connecting two more rigid lateral portions 44*a*, 44*b*, the central portion notably having a lower resistance to stretching, in the direction Y, than the two lateral portions. The ratio between the two resistances can preferably be of the order of 1/1000.

The assembly 40 further includes landing gear support structures. Also, a first support structure 48*a* is arranged to the rear of the gear well 12, being fixed to the roof 20 and offset laterally outward relative thereto. It is moreover fixed to a fuselage frame 50 situated to the rear of the airtight end wall 16, the lower end of this frame 50 being for its part fixed to a fuselage part 52 extending the complete length of the section. As can be seen better in FIG. 6, the part 52 reconstitutes the bottom of the fuselage under the central wing box 2 and is then extended toward the rear by a narrower portion 54 routed longitudinally via the opening of the gear well 12. This portion 54 in the form of a beam divides the opening into two half-openings, each dedicated to the passage of one gear 42*a*, 42*b*. It also enables reception of the gear well doors.

The first support structure 48*a* supports the first landing gear 42*a*. This has a standard design with a leg 56*a* bearing the wheels at one of its ends and being articulated at its opposite end to the first structure 48*a*. The articulation axis 58*a* of the leg 56*a* is preferably inclined in the three directions X, Y and Z so that the leg can be inclined in the directions X and Y when the gear occupies its retracted position. In this regard, it is noted that FIG. 5 represents the gear in the two positions, namely the lowered position and the raised position. In this latter position, the gears are arranged in a plane XY and their legs are inclined so as to form a V open toward the rear (only one of the two retracted gears being visible in FIG. 5).

Apart from the landing gear leg 56*a*, the gear 42*a* includes other structural elements such as one or more lowering actuators, as well as a strut 60*a* generally made up of segments articulated to one another and the lower end of which is articulatedly mounted on the leg 56*a*. For its part the opposite end of the strut 60*a* is articulatedly mounted on the lower face of the first reinforced structure 44*a* of the roof 20, as will be described hereinafter.

Moreover, it is noted that a symmetrical arrangement is provided for mounting the second main landing gear 42*b*, associated with the second reinforced structure 44*b* of the roof 20. In the figures, the elements of this arrangement bear the same reference numbers as the elements that have just been described for the arrangement associated with the first gear 42*a*, the suffix "a" merely having been replaced by a suffix "b" after each reference number.

Figure 7A:
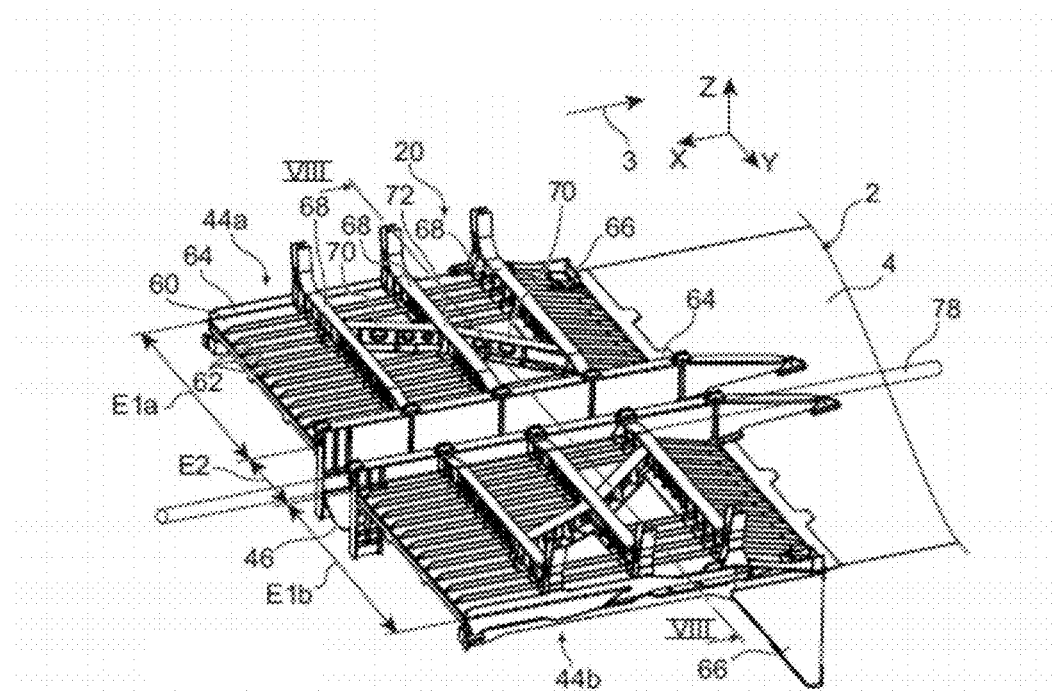
FIG. 7A represents a detailed perspective view to a larger scale of the gear well roof equipping the assembly shown in FIGS. 4 to 6.
Figure 7B:
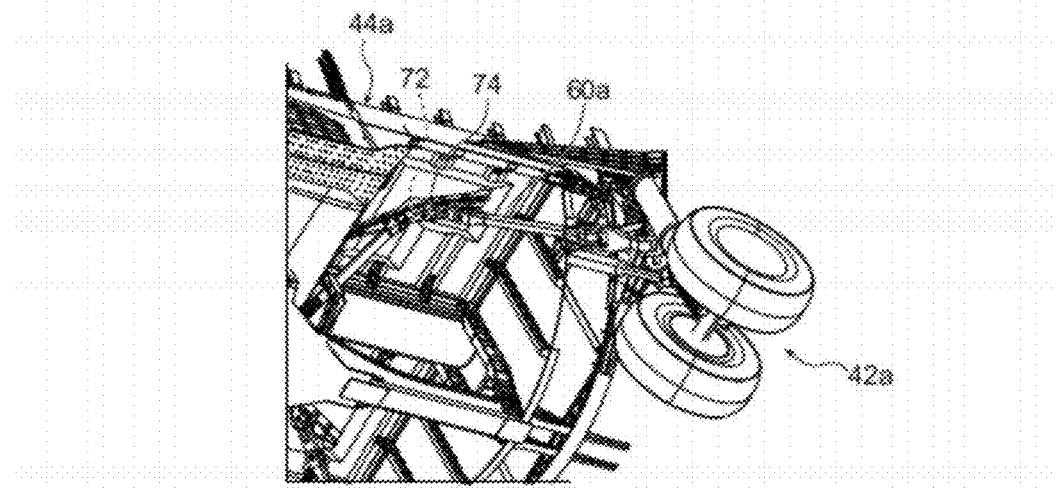
FIG. 7B represents a perspective view from below of the gear well roof shown in the preceding figure.
Figure 8:
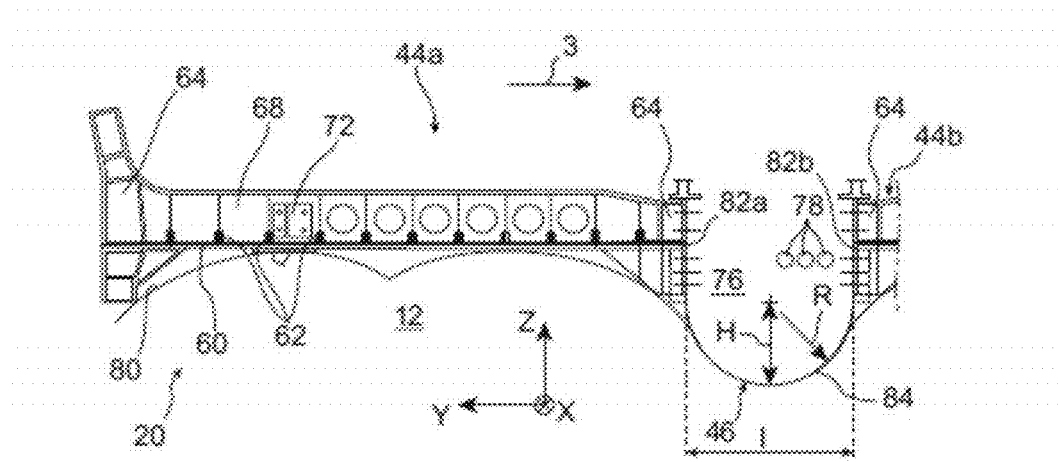
FIG. 8 is a partial view of the gear well roof in cross-section taken along the section line VIII-VIII in FIG. 7A.

Referring now to FIGS. 7A, 7B and 8, the gear well roof 20 will now be described in more detail. The first and second reinforced main structures 44*a*, 44*b* are symmetrical with respect to a median plane XZ. Also, only the first structure 44*a* will be described hereinafter.

It includes a set of stiffened panels 60 arranged in substantially the same plane XY. These panels are stiffened by longitudinal stiffeners 62, produced in one piece with the panels, for example, or attached thereto.

The structure 44*a* also includes two longitudinal beams 64, a first extending along the exterior edge of the set of panels and a second extending along the interior edge of that same set.

The exterior longitudinal beam 64 has a length substantially equal to the total length of the roof 20 in the direction X. It is intended for the connection to the fuselage and is followed longitudinally at the front by a trunk corner 66 enabling the fixing to the rear skin of the central wing box 2. For its part the interior longitudinal beam 64 has a substantially greater length, with a front portion projecting relative to the panels 60, so as to be fixed to the upper skin 4 of the central wing box.

A plurality of transverse beams 68 connects the two longitudinal beams 64. There are three beams 68, for example, each of which therefore extends the complete width of the main structure 44*a*. Intermediate beams 70 interconnect the transverse beams 68. There are two beams 70, for example, joining at the same point 72 on the central transverse beam 68, on respective opposite sides thereof in the direction X.

The beams 70 and the beams 64, 68 are fixedly mounted on the upper surface of the panels 62, in a plane XY. They may be inclined in each of the directions X and Y.

On or in the vicinity of the vertical projection of the point 72 onto the lower surface of the panels 62, mounting 74 is provided enabling the articulation of the end of the strut 60*a*, as can be seen in FIG. 7B. Also, mounting 74 is substantially centered on the main structure 44*a* and takes the form of a fitting with an orifice receiving a pivot pin of the strut 60*a*, for example.

The forces transmitted by the strut 60*a* in the event of dynamic landing are therefore introduced at the level of the central point 72, and can then diffuse within the reinforced structure 44*a*, being routed via the beams 70, the beams 64, 68 and the stiffened panels 60, before being introduced into the central wing box 2.

The components of each main structure 44*a*, 44*b* may be made of metal or composite materials.

The two reinforced main structures 44*a*, 44*b* occupy a large portion of the width of the roof 20. To be more precise, their respective transverse extents, referenced E1*a* and E1*b* in FIG. 7A, are largely greater than the transverse extent E2 of the membrane 46 in the direction Y. In this regard, the ratio between the cumulative extent of the structures 44*a*, 44*b* and the extent of the membrane 46 is preferably between 0.1 and 0.2 inclusive.

A first function of the membrane 46 is to provide the continuity of the pressurization barrier between the two main structures 44*a*, 44*b* that have just been described. It may be made of metal but is preferably made of an elastomer-based material.

As seen better in FIG. 8, it has a rounded shape, preferably of U-shaped cross-section, the radius of curvature R being between 400 and 500 mm inclusive. The membrane 46 also has the vertical median plane XZ as its plane of symmetry, the branches of the U-shape being on respective opposite sides of this plane.

The interior of the U-shape defines a recess 76 open at the top in which are routed systems 78, preferably pipes for the air conditioning system. The space defined by the recesses 78 is therefore cleverly exploited, enabling the longitudinal passage of systems 78 along the roof 20. The U-shape projects generally downward in the gear well 12, i.e. is set back downward relative to the stiffened panels 60. This setting back is effected without hindering the wheels of the raised gear, the contour 80 of which has been partly represented in FIG. 8 for the wheels of the raised first main landing gear.

The membrane 46 has a first end 82a and a second end 82b fixed to the main structures 44a, 44b, respectively, and to be more precise to the interior longitudinal beams 64 of those structures. They are fixed by rivets, bolts or similar fixing elements. Thanks to the U-shape, each of the ends 82a, 82b has a substantially vertical tangent such that the vertical air pressure resultant is advantageously zero at each of these ends.

A main part 84 of the membrane 46 is arranged between the two ends 82a, 82b and forms the rounded part of the U-shape. These parts 82a, 82b, 84 are preferably made in one piece and substantially the same thickness, of the order of 0.7 to 1.5 mm.

In order to provide better mechanical decoupling in the direction Y between the two main structures 44a, 44b, the membrane 46 is preferably free of transverse stiffeners and, as indicated above, has a substantially constant thickness. This mechanical decoupling is advantageously facilitated by the U-shape of this membrane 46, the main part 84 of which has a ratio between a width "I" in the direction Y and a height "H" in the direction Z between 0.7 and 1.3 inclusive.

Figure 9:
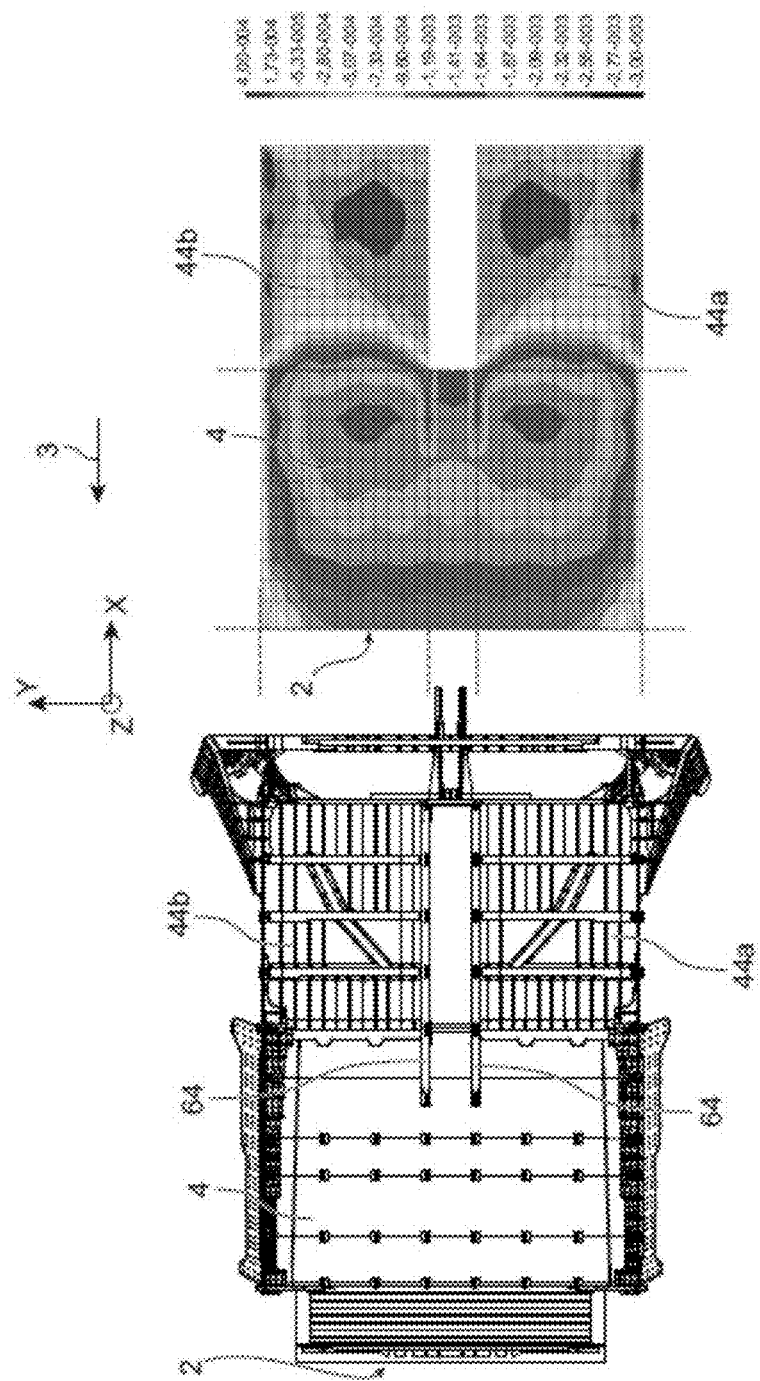
FIG. 9 shows the gear well roof from above together with a graph showing diagrammatically the levels of deformation in the transverse direction in the event of a positive vertical maneuver of the aircraft.

Thanks to this mechanical decoupling between the two main structures 44a, 44b in the direction Y, each of these structures is loaded only by a smaller transverse portion of the central wing box 2. Also, in the case of a positive vertical maneuver of the aircraft leading to a large deformation of the central wing box 2 in the direction Y, the appearance of unintended deformation of the main structures 44a, 44b is limited. The stretching observed in the direction Y, with such a loading situation, has been represented on the FIG. 9 graph. This graph shows that the considerable stretching observed on the upper skin of the central wing box 2 generates only a low level of unintended stretching on each of the two main structures 44a, 44b.

Figure 10:
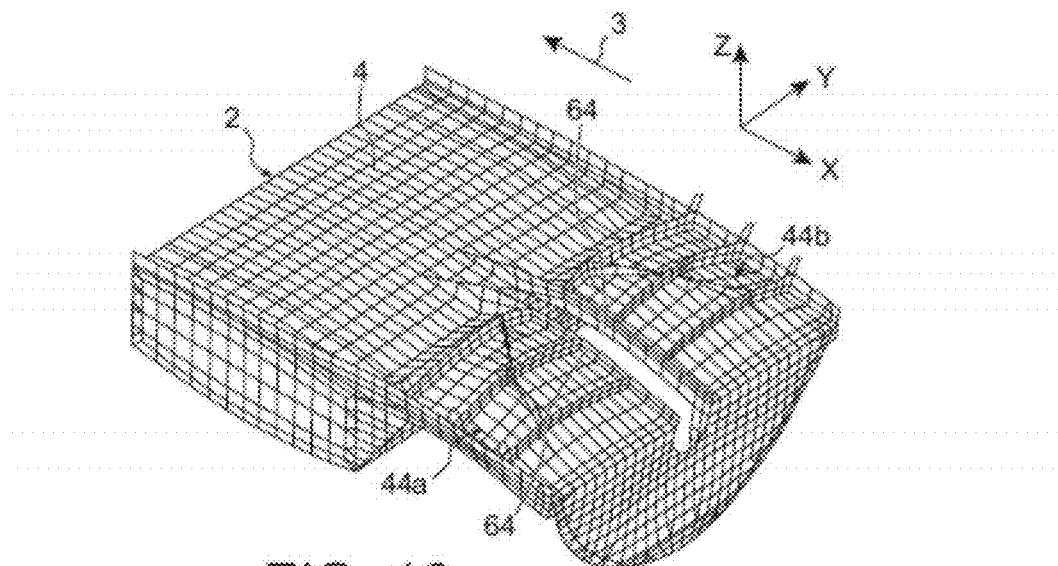
FIG. 10 represents diagrammatically the deformation of the gear well roof in the event of dynamic landing.

Moreover, FIG. 10 shows the small deformations of the two main structures 44a, 44b in the case of dynamic landing, the intrinsic stiffness of these structures in fact making it possible to absorb appropriately the mechanical forces coming directly from the main landing gear. These forces are then transmitted to the central wing box 2, in which they are easily absorbed and dissipated.

Of course, diverse modifications may be made by the person skilled in the art to the disclosure herein that has just been described by way of nonlimiting example only.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft landing gear well roof, the roof forming a pressurization barrier between a pressurized upper compartment and a gear well for accommodating a first main landing gear and a second main landing gear of an aircraft, the roof comprising:
    a first reinforced main structure having a first stiffened panel extending across a landing gear well of the first main landing gear and a second reinforced main structure having a second stiffened panel extending across a second landing gear well of the second main landing gear, the first and second reinforced main structures spaced from each other in a transverse direction of the aircraft, wherein the first reinforced main structure comprises a mounting for articulating the first main landing gear and the second reinforced main structure comprises a mounting for articulating the second main landing gear; and
    a flexible central membrane disposed between the first and second reinforced main structures in the transverse direction and connecting the first and second reinforced main structure along interior longitudinal edges thereof, such that the first and second reinforced main structures are mechanically decoupled from one another in the transverse direction.

2. The gear well roof according to claim 1, wherein the central membrane has a rounded U-shape that defines a downward recess in an upper surface of the roof.

3. The gear well roof according claim 1, wherein the membrane has a curvature with a radius between 400 and 500 mm inclusive.

4. The gear well roof according to claim 2, wherein the membrane has a first end and a second end fixed to the first reinforced main structure and the second reinforced main structure, respectively, a main part of the membrane being arranged between the first end and the second end.

5. The gear well roof according to claim 4, wherein the first end and the second end each have a substantially vertical tangent.

6. The gear well roof according to claim 4, wherein the main part of the membrane has a substantially constant thickness of 0.7 to 1.5 mm.

7. The gear well roof according to claim 4, wherein the main part of the membrane is free of transverse stiffeners.

8. The gear well roof according to claim 4, wherein the main part of the membrane has a ratio between a width in the transverse direction and a height in a vertical direction between 0.7 and 1.3 inclusive.

9. The gear well roof according to claim 1, wherein the membrane is made of a metal or of an elastomer-based material.

10. The gear well roof according to claim 1, wherein the mounting for articulating a structural element of the first landing gear is substantially centered on the first reinforced main structure and the mounting for articulating a structural element of the second landing gear is substantially centered on the second reinforced main structure.

11. The gear well roof according to claim 1, wherein a ratio between a transverse extent of the membrane and a transverse extent of the first and second reinforced main structures is between 0.1 and 0.2 inclusive.

12. The gear well roof according to claim 1, wherein each of the first and second reinforced main structures comprises a panel or a set of stiffened panels as well as at least one additional longitudinal beam and at least one transverse beam.

13. An aircraft comprising an aircraft landing gear well roof, the roof forming a pressurization barrier between a pressurized upper compartment and a gear well for accommodating a first main landing gear and a second main landing gear of the aircraft, the roof comprising:
a first reinforced main structure having a first stiffened panel extending across a landing gear well of the first main landing gear and a second reinforced main structure having a second stiffened panel extending across a second landing gear well of the second main landing gear, the first and second reinforced main structures spaced from each other in a transverse direction of the aircraft, wherein the first reinforced main structure comprises a mounting for articulating the first main landing gear and the second reinforced main structure comprises a mounting for articulating the second main landing gear; and
a flexible central membrane disposed between the first and second reinforced main structures in the transverse direction and connecting the first and second reinforced main structure along interior longitudinal edges thereof, such that the first and second reinforced main structures are mechanically decoupled from one another in the transverse direction.

14. An assembly for an aircraft comprising:
a central wing box for connection of two wings on respective opposite sides thereof in a transverse direction;
an aircraft landing gear well roof, the roof forming a pressurization barrier between a pressurized upper compartment and a gear well for accommodating a first main landing gear and a second main landing gear, the gear roof comprising:
a first reinforced main structure and a second reinforced main structure spaced forming respective roofs above the first and second main landing gears from each other in a transverse direction of the aircraft, wherein the first reinforced main structure comprises a mounting for articulating the first main landing gear and the second reinforced main structure comprises a mounting for articulating the second main landing gear; and
a flexible central membrane disposed between the first and second reinforced main structures in the transverse direction and connecting the first and second reinforced main structure along interior longitudinal edges thereof such that the first and second reinforced main structures are mechanically decoupled from one another in the transverse direction,
wherein the central wing box and the gear roof each extend transversely a complete width of a fuselage of the aircraft, and wherein the gear roof is arranged at a rear of the central wing box and each of the first and second reinforced main structures is fixedly mounted to the central wing box;
structural elements of the first and second main landing gears articulatedly mounted on each mounting; and
systems routed longitudinally in a recess delimited by the membrane of the gear well roof.

15. The assembly according to claim 14, wherein each of the first and second main landing gears comprises a leg articulated about an articulation axis inclined relative to the transverse direction and inclined relative to a longitudinal direction.

16. The aircraft comprising an assembly according to claim 14.

* * * * *